May 2, 1939.  G. DE BOTHEZAT  2,156,334
HELICOPTER
Filed Dec. 30, 1937  5 Sheets-Sheet 1
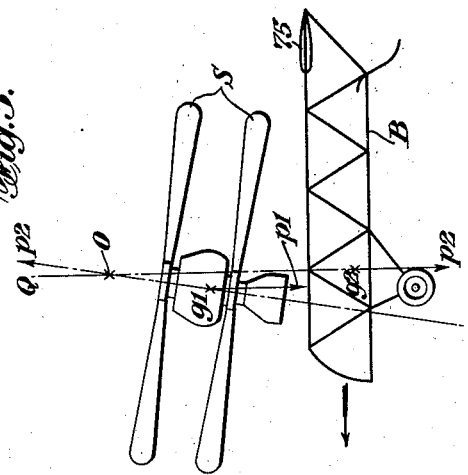
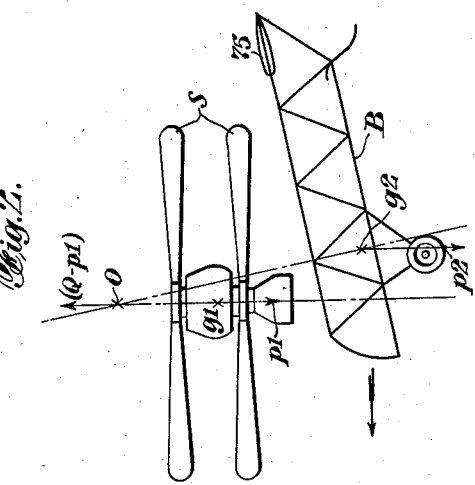
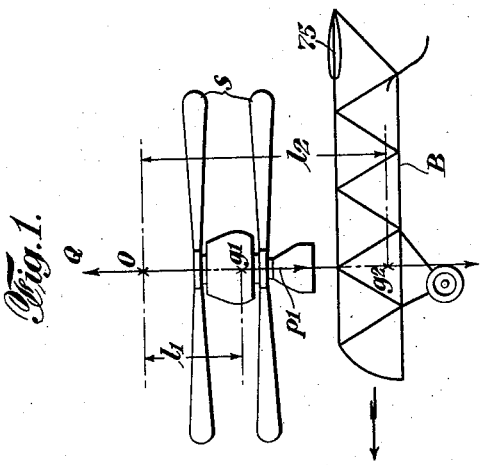
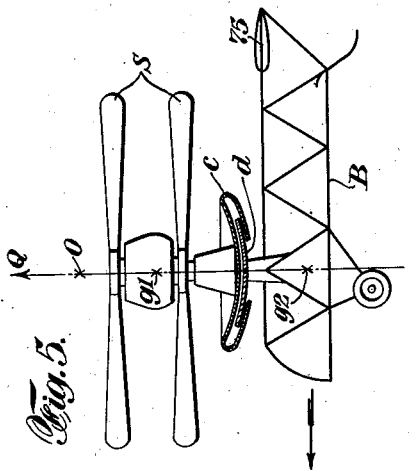
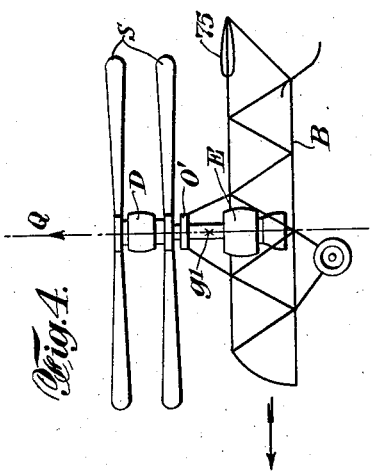
INVENTOR
George de Bothezat
BY
Edward S. Brunsail
ATTORNEYS

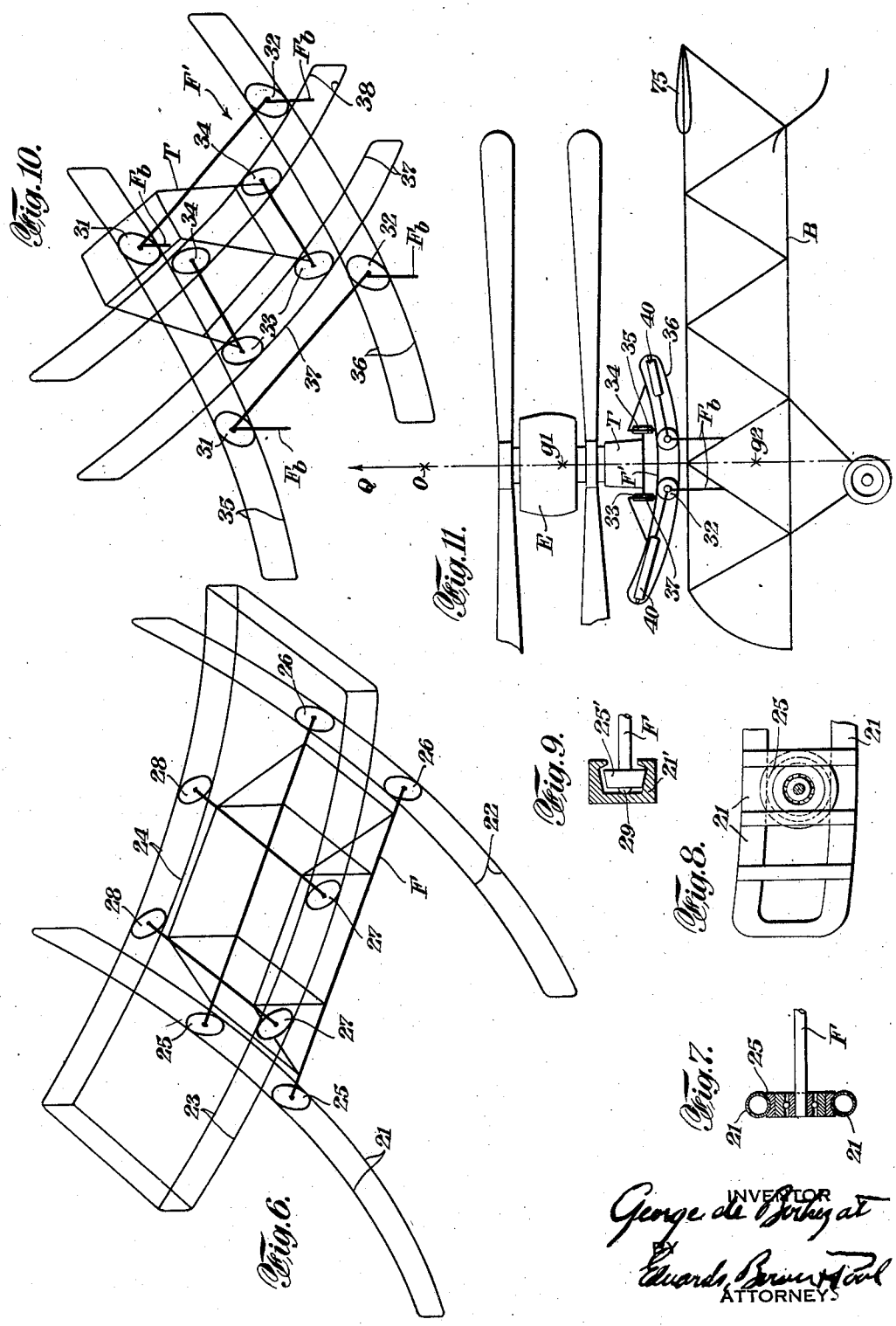

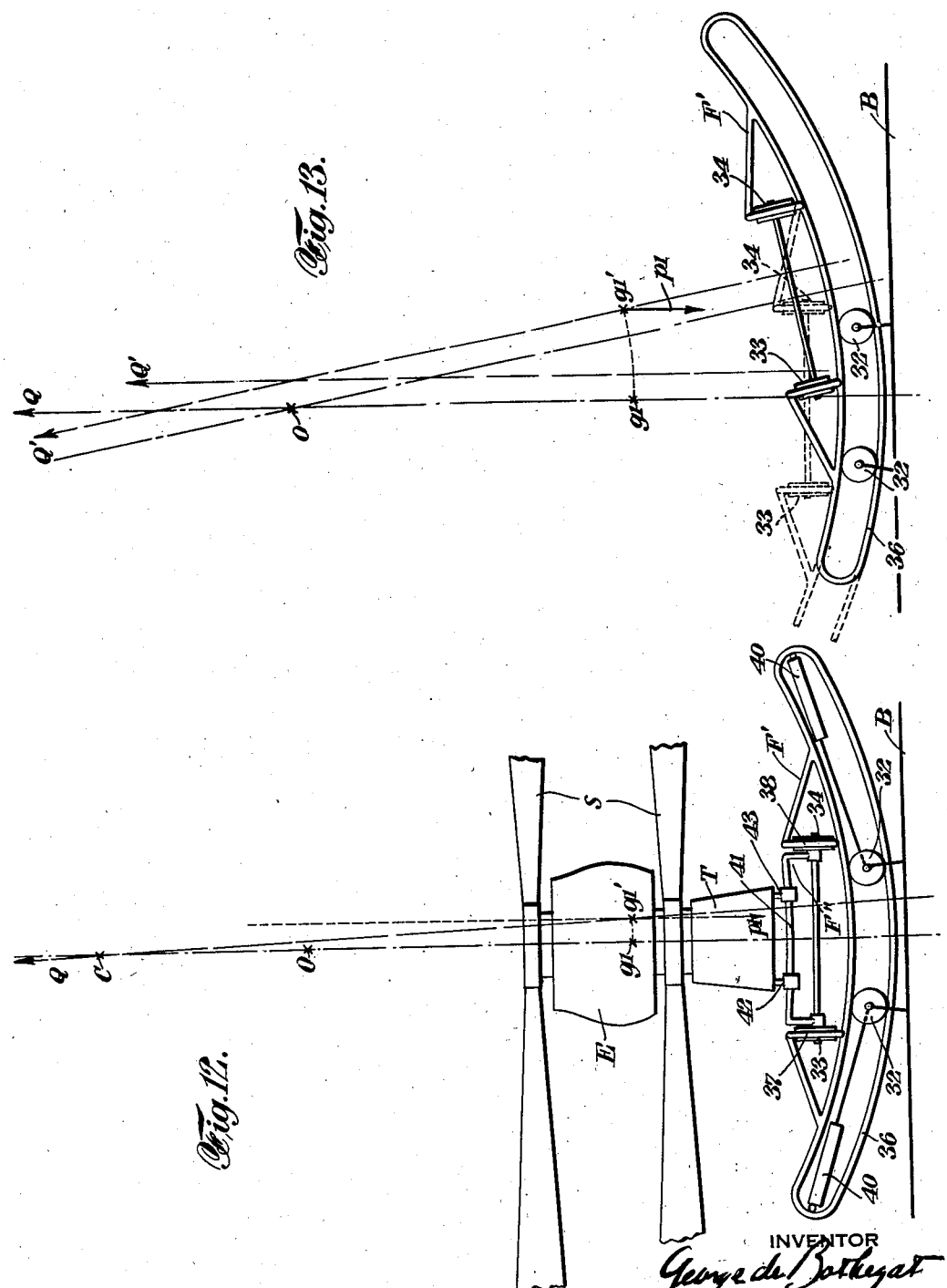

May 2, 1939.　　　G. DE BOTHEZAT　　　2,156,334
HELICOPTER
Filed Dec. 30, 1937　　5 Sheets-Sheet 4
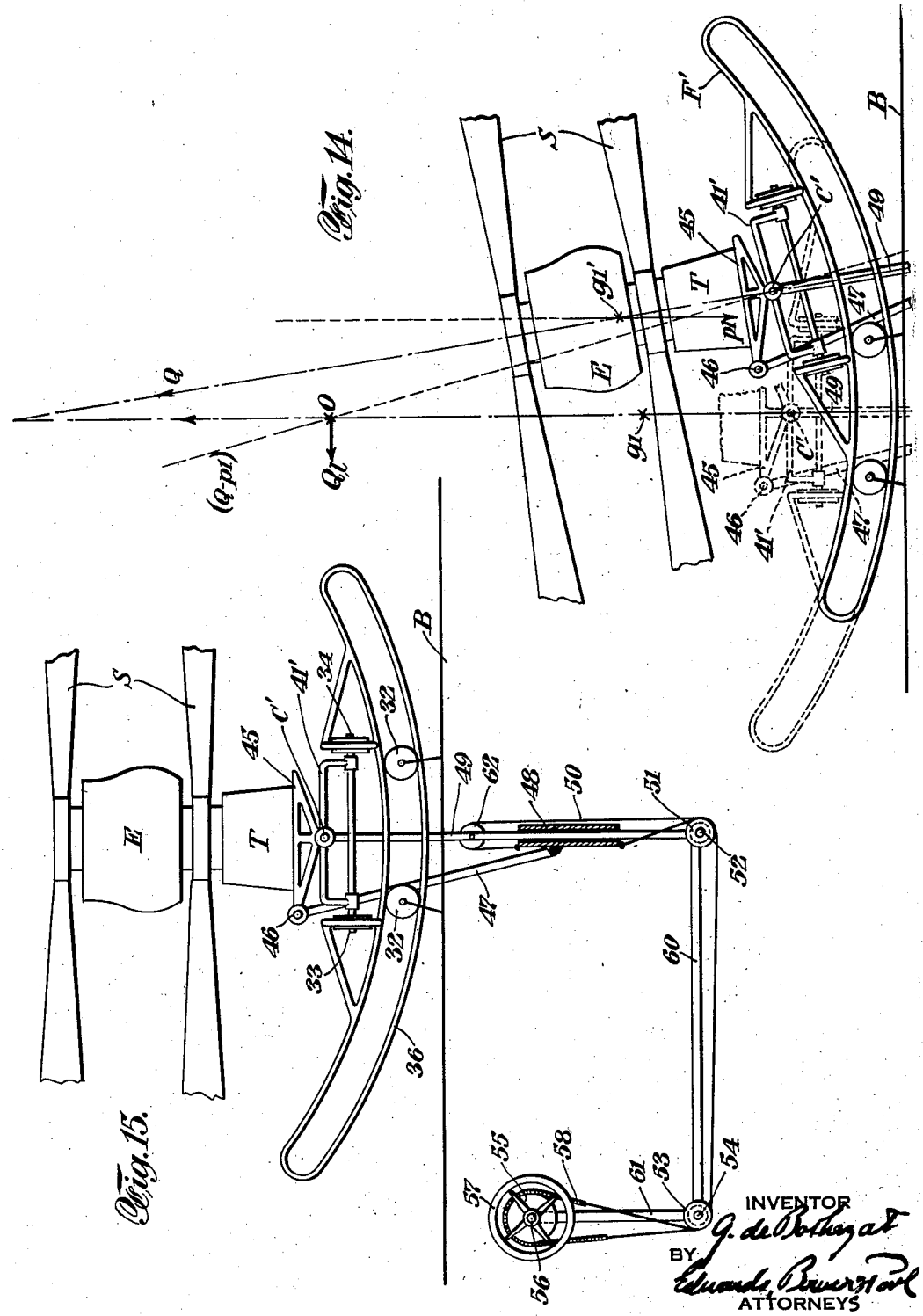

May 2, 1939.  G. DE BOTHEZAT  2,156,334
HELICOPTER
Filed Dec. 30, 1937  5 Sheets-Sheet 5
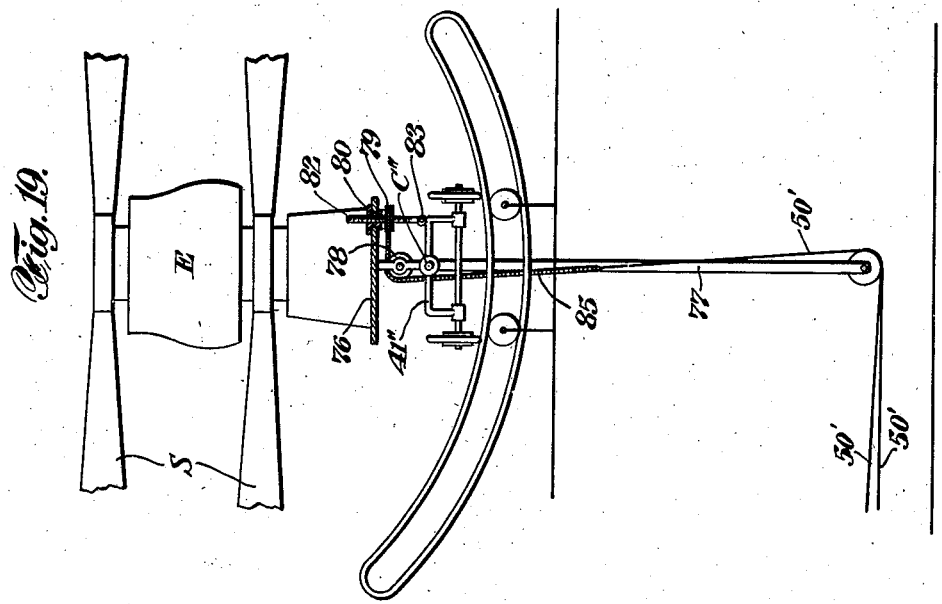
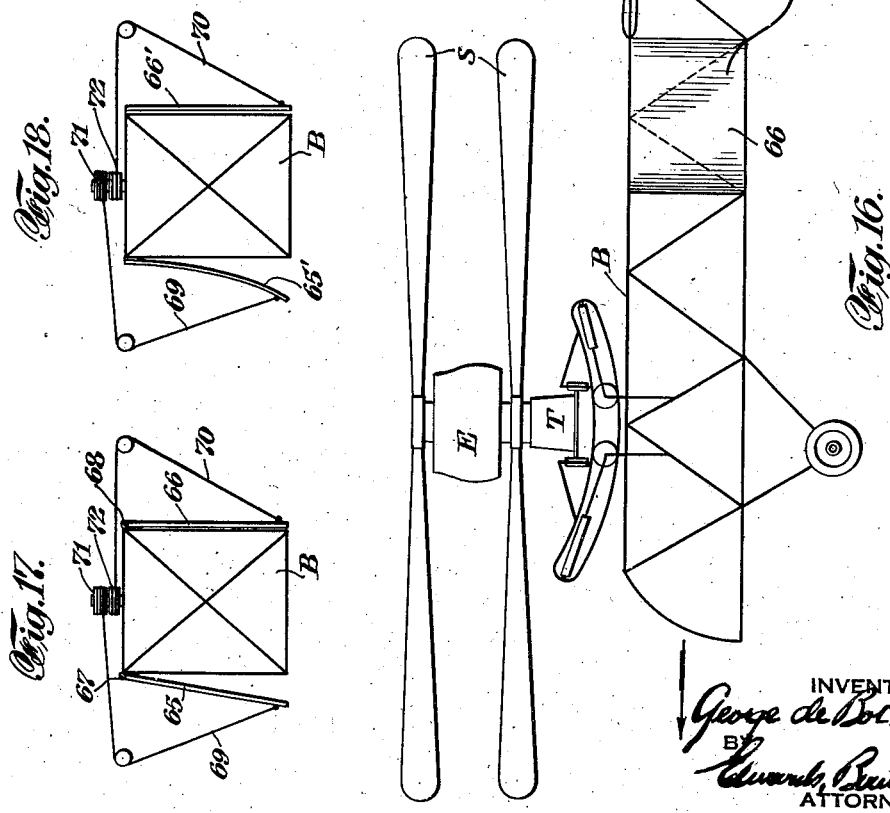
INVENTOR
George de Bothezat
BY
ATTORNEYS Patented May 2, 1939

2,156,334

UNITED STATES PATENT OFFICE 2,156,334

HELICOPTER

George de Bothezat, New York, N. Y., assignor to Helicopter Corporation of America, Long Island City, N. Y., a corporation of New York Application December 30, 1937, Serial No. 182,399

6 Claims. (Cl. 244—17)

This invention relates to aircraft of the helicopter type and particularly to a construction insuring the inherent stability of such apparatus.

The object of the invention is to provide a helicopter which will be self-adjusting to maintain the proper operative and stable relation between the lifting unit and the loaded part.

A further object of the invention is to provide a helicopter which while using airscrews pivotally suspended at their hubs will be fully effective to maintain stability of the craft as a whole.

A further object of the invention particularly in the division of the helicopter into relative pivoted parts will appear from the following description taken in connection with the following drawings, in which Figs. 1, 2 and 3 are diagrammatic elevational views illustrating the invention and showing different relations between the parts of the helicopter;

Figs. 4 and 5 are elevational views illustrating in outline two forms of helicopters embodying the invention;

Fig. 6 is a diagrammatic perspective view illustrating a system of attachment between the upper and lower parts of the helicopter;

Fig. 7 is a detailed sectional view illustrating the roller and track parts of the apparatus shown in Fig. 6;

Fig. 8 is an elevational view illustrating the structure of the track and roller element of Fig. 6;

Fig. 9 is a sectional view illustrating a modified track and roller construction;

Fig. 10 is a diagrammatic perspective view illustrating a modified system of connection between the upper and lower parts of the helicopter;

Fig. 11 is an elevational view of a modified form of helicopter;

Fig. 12 is an enlarged diagrammatic view illustrating the relations of the parts of the helicopter shown in Fig. 11;

Fig. 13 is a diagrammatic view showing different relative positions of the upper part of the helicopter;

Fig. 14 is a partial elevational diagrammatic view showing a system of control of the tilting of the upper part of the helicopter with relation to the lower part;

Fig. 15 is a partial elevational diagrammatic view showing the tilting of the upper part of the helicopter with relation to the lower part;

Fig. 16 is a diagrammatic elevational view showing the helicopter provided with control fins located in and out of the slip stream;

Figs. 17 and 18 are diagrammatic cross sectional views illustrating the operation of the slip stream fins; and Fig. 19 is a diagrammatic view illustrating a modified method of controlling the tipping of the upper part of the helicopter with relation to the lower part.

It has been demonstrated that there is great advantage in having the blades of large air screws suspended pivotally at their hubs, i. e., connected to the hubs through universal joints or equivalent arrangements, air screws so mounted being almost entirely relieved of bending and subject mostly to tension alone. A helicopter using such suspended blades could not be rendered inherently stable by any aerodynamical forces emanating from the air screws because the suspension of the blades precludes the possibility of developing any substantial aero-dynamical moments and transmitting these to the body of the helicopter. Air screws with hinged or suspended blades are relatively insensible to air disturbances insofar as the production of aero-dynamical moments in relation to the axis of their rotation is concerned, because such disturbances produce chiefly an oscillation of the blades around their hinges and are therefore practically not transmitted further.

As a direct result such air screws are unable to generate any substantial restoring torque or moments.

The present method of insuring stability of the helicopter is specially intended for use with pairs of air screws where one propeller or air screw is disposed right under the other in the same slip stream but rotating in opposite directions, for instance as shown in applicant's copending application Serial No. 92,307.

It is apparent that if such a pair of air screws together with the engine operating them is attached in suspended relation to the body of the flying machine (the fuselage containing the pilot and passengers with the landing gear) at a point above the centers of gravity of both, the air screw-engine set and the helicopter body with such system would be inherently stable.

Referring for example to the helicopter schematically represented in Fig. 1, S represents the two air screws and the engine driving them and with the gasoline tank located directly underneath, and it is presupposed that this unit is in some way suspended at O through a connection permitting oscillation of the unit S in all directions. It is also assumed that the body B of the helicopter is independently rigidly connected to this center of oscillation O. The whole system then takes the form of two pendulums, the S unit being the shorter one with its center of gravity at $g_1$ and the other, the longer one, comprising the helicopter body B with its center of gravity at $g_2$. Both able to oscillate around the center O the period of oscillation of unit S is naturally shorter than that of the unit B because the length $l_1(Og_1)$ is substantially less than the length $l_2(Og_2)$.

If such a system gets an inclination either longitudinal or lateral, the result may be considered under three conditions:

1. If the body B swings out of position (see Fig. 2) then the thrust Q of the upper unit S will prevent the point of suspension O developing any substantial downward acceleration and the weight $p_2$ of the body B will swing it back into position.

2. If unit S swings out of position then its weight $p_1$ will produce the restoring action (see Fig. 3). It should be noted that disturbances of unit S will occur rather seldom because of the use of the suspended type of propeller blades.

3. If both units S and B simultaneously take the same deviation from the vertical then the unit S having a shorter period of oscillation will be the first to swing out of the center line O $g_1$ $g_2$, and thereafter the flying machine will be found substantially in the conditions of case 1. Of course, sufficient damping must be provided on the relative movement even when the helicopter is hovering in order that no mutual amplification of the oscillations may develop.

A method of securing the suspension of the unit S above its center of gravity would be to drive both propellers by an engine located sufficiently below the propeller so as to obtain the relation represened in Fig. 4 where E is the engine with the gasolene tank below suspended by a universal joint O' to the body B and driving a system of propellers or air screws through a gear drive D located between the air screws (as illustrated for instance in applicant's copending application Serial No. 182,400). This would require a rather long connecting member (see Fig. 4) between the engine and the air screws in order to get the desired values of the lengths $l_1$ (O $g_1$) and $l_2$ (O $g_2$) for reliable inherent stability.

Another method is to connect units S and B so that their relative motions are as though they were rotating around a common center O. In such case any point of unit S or unit B describes a line on a sphere having O as a center when units S and B oscillate around the point O. Thus it is sufficient to connect units S and B by an intermediary of a sliding spherical fit as illustrated in Fig. 5, in order to attain the rotation of both units S and B around the center of oscillation O. Such spherical joint may for example consist of a spherical disk $d$ rigidly connected to the body B and sliding easily within a spherical casing $c$ rigidly connected to unit S and opened at the bottom for the suspending connection to the disk $d$. Such connection of units S and B permits the lengths $l_1$ and $l_2$ to be given any required values and permits the engine to be located between the air screws so that very light types of driving means for the air screws may be adopted.

This arrangement of Fig. 5 also permits the torques of the air screws to be self-balancing when slight differences between the two opposite torques occur, the lifting unit S being free to rotate around the vertical axis. It has the disadvantage of requiring an engine the operation of which is not affected by slight rotation and in addition further complicates the installation of the controls between the relatively rotating set S and the body B of the helicopter, the rotation of which is prevented by vertical fins attached to the body and appropriately disposed in the slip stream from the air-screws.

To permit relative tipping of the helicopter parts without relative rotation, the units S and B may be connected by a system of cylindrical trackways and rollers illustrated in Fig. 6. In this system the trackways 21, 22 are cylindrical around an axis through the center of oscillation O and are connected rigidly to the helicopter body B. The trackways 23, 24 are also cylindrical around an axis through the center of oscillation O and at right angles to the cylindrical axis of trackways 21, 22, the trackways 23, 24 being rigidly connected to the upper unit S. The trackways are connected by a frame or carriage F through the medium of eight rollers in two sets. The rollers 25, 26 of one set run in trackways 21, 22 respectively and the rollers 27, 28 of the other set run in trackways 23, 24 respectively, all of these rollers being rotatably connected to the frame F as indicated diagrammatically in Fig. 6. A typical roller is shown in Fig. 7 with the trackway construction indicated in Fig. 8, and an alternative roller and track in Fig. 9 where the channel 21' has overhanging edges trapping the roller 25', which is provided at its end with the ball caster 29. This system of connection provides two cylindrical surfaces with mutually perpendicular axes passing through the center of rotation O, one of the axes preferably being perpendicular to the plane of symmetry of the helicopter and the other disposed in the plane of symmetry. It is not necessary that the two axes precisely pass through and intersect at the center O. The carriage or frame F therefore freely rolls in both lateral and longitudinal direction. There is, of course, a small clearance between the rollers and the rails or tracks, and when the air screws are not lifting then the rollers bear upon the lower rails or tracks 21, 22 and on the upper rails or tracks 23, 24. In flight the rollers bear upon the upper tracks 21, 22, and upon the lower tracks 23, 24. It is quite evident that such rail and carriage system located between the air screw-engine set S in the body of the helicopter body B is as to relative movement equivalent to their pivotal connection at the center of oscillation O located above their centers of gravity.

Instead of having the rails attached to the upper unit S and the body unit B the rollers may be connected to these units and the intermediate frame or carriage formed by a double system of tracks or rails connected to be engaged by the rollers as shown in Fig. 10. Here the upper unit S is connected through frame holding its gas tank T to sets of rollers 33, 34 mounted on the lower part of the tank while the lower body B is connected through suspension members $F_b$ to sets of rollers 31, 32. The intermediate frame F' comprises the longitudinal rails or trackways 37, 38 circling around the oscillation O, and the transverse trackways 35, 36 also circle around this same center, the two trackways being connected together in a single frame F". The rollers 31, 32 connected to the helicopter body B run in the trackways 35, 36 respectively while the rollers 33, 34 of the unit S run in trackways 37, 38 respectively.

With this system of helicopter will appear as schematically represented in Fig. 11 where E is the engine operating the two air screws in opposite directions, T is the gasolene tank and 40 are hydraulic dampers at the ends of the trackways, these dampers being of any conventional type installed in the both longitudinal and lateral rails and limiting the oscillations to aperiodic or substantially aperiodic oscillations. Any attachments of the air screw-engine unit S to the body of the helicopter body B as shown in Figs. 5, 6, 10 and 11 may be called a high-center suspension insuring a complete inherent stability of the helicopter and also advantageous in connection with other features of helicopter operation.

In order to secure a forward motion of the helicopter, it is sufficient to tilt the thrust line Q of the air screws forward, at the same time preserving complete inherent stability in forward motion.. With the high-center suspension, this can be attained as illustrated in Fig. 12. The air screw-engine set S in addition to being oscillatable around the center O, which will be called the dynamical center because the system freely oscillates around this center, is also made movable around the axis C, located above all and which will be called the static axis. This axis C is perpendicular to the plane of symmetry of the helicopter. The unit S is only displaced in the longitudinal sense around this axis and is automatically locked in different positions after being set under the desired inclination.

This may be attained, for example, by sliding the air screw engine set S longitudinally along a cylindrical surface having C as an axis, this surface being in the form of curved rails, such as 42, 43 (see Fig. 12) rigidly attached to the top of a carriage 41 carried by the rollers 33 of the system of the previously described "rolling rails". It can be readily shown that the statical axis C can be taken at such distance above the dynamical center O that the moment of the air screw thrust Q and the weight $p_1$ of the unit S will both balance (for a given value Q) in relation to the dynamical center O for any angle of displacement of the set S along the guides 42, 43. This means that if the air screw set S is tipped by a given angle around the center C and locked in such adjusted position, the whole system will remain in equilibrium in relation to the dynamical center O as was previously the case when the thrust Q was truly vertical. Only now the thrust Q will have an inclined orientation, the whole system being still able to freely oscillate as previously upon the rolling rails and thus the inherent stability fully insured as previously, but only with a horizontal component of the thrust Q longitudinally. It is this longitudinal component which will produce the forward motion of the helicopter, only small inclinations of the thrust being required and not exceeding ten to twelve degrees at the most relative to the vertical to give high forward speeds of the helicopter even exceeding the speed of aeroplanes.

The distance of the statical axis C from the dynamical center O will be determined for the average value of Q (the value most used in flight). For other values of Q the engine set S will always find a position of equilibrium around the dynamical center O because for a given setting of Q the moment of Q in relation to O does not change, but the moment of $p_1$ does change when the system rolls on longitudinal rails. Thus for every inclination of Q (for values of Q differ from the average value) a special position of equilibrium on the longitudinal rails will automatically establish itself varying from the standard position. The same result, that is the balancing of the engine set S upon the "rolling rails" for the inclined position of the thrust Q, can also be brought about by other mechanisms requiring a somewhat greater length of the rolling rails.

For example, the guiding rails 42, 43 may be made straight corresponding to location of the statical axis at infinity. Then after the displacement of Q parallel to itself there will be a rolling on the longitudinal rails until the moment of $p_1$ in relation to the dynamical center O balances the moment of Q. The whole system will thus find a position of equilibrium as indicated in Fig. 13. The position of the engine set S before and after the thrust Q was shifted to its off-center position is correspondingly represented in dot and dash lines.

The engine set S may also be mounted to rotate around a low axis, such at C' in Fig. 14. The displacement of the engine set S around this axis C' may be effected by a rod 47 articulated at 46 with the pivoted table 45 carrying the engine set while the other end of the rod 47 is articulated with a sliding sleeve (see 48 in Fig. 15). By moving the guide or sleeve up and down along the rod 49 articulated at C', the thrust Q will be tilted. Upward movement of the sliding guide will first tilt this thrust Q backwards but the moment of the thrust in relation to the dynamical center will immediately roll the system upon the rolling rails and the final established balance will find the thrust Q inclined forward. A simple calculation will show that the angle of rolling is approximately equal to twice the angle of adjusting or tilting of the thrust Q. The full lines in Fig. 14 represent the final balance of the system upon the rolling rails. Around this position the inherent stability both longitudinal and lateral is fully insured as previously explained.

The tilting around the axis C' and the locking of the system under any given angle can be achieved by any appropriate mechanical means or can be achieved by an electric servo-motor. In the arrangement shown in Fig. 14 the tilting of Q can be controlled from mechanism as schematically outlined in Fig. 15, it being understood that the arrangement of Fig. 14 requires very little effort to tilt the thrust Q because it involves only a small up and down displacement of the center $g^1$. In this tilting mechanism as shown in Fig. 15 the slide 48 mounted on the rod 49 is controlled by connection to opposite ends of the continuous cable 50 running from the upper end of the slide around the pulley 62, then around the pulley 51 at the lower end of the rod 49 and then around the pulley 53 at the other end of the horizontal rod 60 and then around the control wheel 55 of the pilot control and back around another pulley, duplicate of 53, and another pulley, duplicate of 52, and then back to the lower end of the slide 48. At the area of contact with the control wheel 55, the cable is preferably provided with a chain portion. The control wheel 55 is operated by the pilot hand wheel 57 and turns around an axis at the top of the rod 61, pivoted by a floating universal joint 54 to the rod 60, which in turn is pivoted by another floating universal joint 52 to the rod 49. The hand wheel 57 is mounted for operation by the pilot seated in the helicopter body B with the result that the thrust Q is correspondingly tilted. The linked rod and roller rails do not interfere at all with the relative movements, longitudinal and lateral, of the engine set S upon its rails. When this engine set oscillates the rod 61 oscillates back and forth, the rod 60 oscillating on its two floating universal joints 54 and 52, rod 49 following oscillation of engine set S. The wheels 55, 57 move very little and remain well within control of the hands of the pilot, and the handling of this double wheel by the pilot will have very little effect upon the inherent oscillations of the engine set S because of the almost complete absence of any leverage at the wheel. The locking arrangement for the adjustment may be at the hand of the pilot connecting with the wheels 55, 57 or be at the slide 48 and arranged to be automatically released as soon as either end of the cable 50 is put under tension.

When the thrust Q is first tilted forward by pulling on the cable 50, this will give rise to a horizontal component of Q directed backwards as the system finds its balance. Such action in the helicopter when moving forward will constitute a breaking of the forward movement and can be brought about by the pilot in flight and will constitute a powerful means for decelerating the forward motion of the helicopter, at landing, for instance, or even in full flight, when required. This is a very important property of the above described high center suspension used together with the thrust tilting.

Whenever the thrust Q is tilted a horizontal component of the tilting is developed. As all the moments of the forces applied to the engine set must balance in relation to the dynamical center O around which this set freely oscillates, these forces at the dynamical center O will reduce themselves to a vertical component $(Q-p_1)=p_2$ (the weight of the body and a horizontal component $Q_1$, see Fig. 14) and a horizontal component equal to the drag of the helicopter body; this force $Q_1$ being applied at the high center O to the body will tend to tilt the helicopter body, but this last tilting can be easily overcome by providing the helicopter body with a horizontal tail plane 75 or a horizontal fin, as shown in Figs. 1, 2, 3, 4, 5, 11 and 16. Now as the drag of the helicopter body equal to the thrust component $Q_1$ is proportional to the square of the flying speed and as the air pressure upon the horizontal fin 75 is also proportional to the square of this same speed, then if the tail plane 75 will overcome the titlting effect of $Q_1$ for one flying speed, it will overcome this tilting effect for all flying speeds. The conclusion is therefore arrived at that in this helicopter the tail plane does not need to be an elevator. If when operating the throttle of the engine slight changes of the incidence of the tail plane are required, this will be automatically supplied by slight tilting of the helicopter body itself.

Thus in a helicopter rendered inherently stable by the high center suspension and the forward motion produced by tilting the thrust Q attained in term by creating a moment of Q in relation to the dynamical center O, the tilting component $Q_1$ of Q may be balanced by a fixed tail plane, such as 75 located outside the slip stream of the air screws.

To insure a straight trajectory of the helicopter in flight and to provide for its turning left and right in motion or in hovering, vertical fins 65, 66 are provided located inside the air screw slip steam. Such vertical fins 65, 66 can be hinged around horizontal axes 67, 68 parallel to the plane of symmetry of the body (Fig. 17) and their movements left and right inside the slip stream, with a one sided or two sided action, can be obtained by connecting cables 69, 70 and reels 71, 72. Or as shown in Fig. 18 the fins 65', 66' may be rigidly held at the top and made flexible so that a turning action is secured by their bending.

In Fig. 19 the adjusting means for the table 76 is automatically self-locking so as not to require any separate locking and unlocking mechanism or movement. Here this table 76 is mounted at the end of the rod 77 pivoted around the center C'' of the carriage 41''. The adjusting cable 50' has its two ends connected to the opposite ends of a chain 85 extending around rollers 78 pivoted upon the center C'' and this chain 85 loops around the chain wheel 79 of the spool 80 passing through the slot 81 of the table 76 and having flanges loosely engaging the upper and lower surfaces of said table. The spool 80 is threaded on the screw 82 pivoted at 83 on the carriage 41', and as the chain is pulled one way or the other by the cable 50' the chain wheel 79 turns the spool 80 to tip the table 76. A floating rod with two universals at both ends connects rod 77 to a wheel operated by pilot as in Fig. 15.

I claim:

1. A helicopter comprising an upper lifting unit and a lower load carrying unit and means for supporting said units relatively movable around a center of suspension above the center of gravity of each so as to secure inherent stability both longitudinally and laterally, said means consisting of relatively sliding parts curved about the center of suspension as a center to provide relative motion both longitudinally and laterally and normally free to move in said directions.

2. A helicopter as set forth in claim 1 in which the center of relative oscillation between the units is above the highest point of the upper unit.

3. A helicopter comprising a lifting unit and a load carrying unit relatively oscillatable around a center of suspension above the center of gravity of each and means for tilting the air screw thrust in the plane of symmetry by creating a moment of this thrust in relation to said center of suspension which moment maintains the thrust in its inclined position.

4. A helicopter as set forth in claim 3 in which the lifting unit is pivoted to an intermediate carriage having with relation to the load carrying unit a universal adjustment longitudinally and laterally spherical around the center of suspension.

5. A helicopter as set forth in claim 3 in which one part of the lifting unit is pivoted to oscillate longitudinally with relation to the other part of the lifting unit and means is provided on the load carrying unit connected to the lifting unit to control the direction and amount of pivoting between the parts thereof.

6. A helicopter as set forth in claim 1 in which the lifting unit and the load carrying unit are connected by a track and roller system in which the tracks are at right angles to each other and the rails of the tracks are curved circularly around the center of suspension as a center.

GEORGE DE BOTHEZAT.